United States Patent Office 3,038,010
Patented June 5, 1962

3,038,010
N-(β,β,β-TRINITROETHYL)-ACETAMIDE
Pliny O. Tawney, Passaic, N.J., assignor to United States Rubber Company, New York, N.Y., a corporation of New Jersey
No Drawing. Filed July 7, 1950, Ser. No. 172,619
3 Claims. (Cl. 260—561)

This invention relates to a new compound made from trinitromethane, formaldehyde and acetamide and methods for making it. This new compound, N-(β,β,β-trinitroethyl)-acetamide, is useful as an explosive or propellant.

The new compound of my invention is N-(β,β,β-trinitroethyl)-acetamide. It is made by reacting acetamide with formaldehyde in the presence of an alkaline catalyst, subsequently neutralizing the catalyst and finally reacting the intermediate N-methylol acetamide with trinitromethane.

The acetamide and formaldehyde are brought together, preferably in equimolar proportions and preferably in a suitable solvent such as water to which has been added a small amount of an alkaline material. Such alkaline materials are the alkaline and alkaline earth hydroxides and carbonates which bring the pH of the solution above 7. The solution is neutralized after a suitable time, preferably with a weak acid such as carbon dioxide. The intermediate compound, without being separated from the neutralized solution, is reacted with trinitromethane, preferably in equimolar proportions. After being heated for some time the solution is cooled, thereby causing the reaction product to crystallize. It may be recovered conveniently by crystallization.

Alternately, the intermediate N-methylol acetamide may be purified by separation from the solution and subsequently reacted with trinitromethane in a mutual solvent such as water, thereby improving the yield of the N-(β,β,β-trinitroethyl)-acetamide somewhat.

The reactions are assumed to be as follows:

(1)
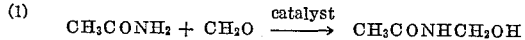

(2)
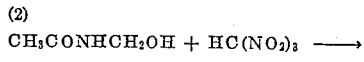
$$CH_3CONHCH_2 \cdot C(NO_2)_3 + H_2O$$

Reaction 1, of course, is well known. I may carry out the reactions with or without isolation of the intermediate N-methylol acetamide. However, I have found that the yield of N-(β,β,β-trinitroethyl)-acetamide is somewhat improved if the intermediate is isolated.

In the following examples all parts are by weight.

*Example 1*

A solution of 1.77 parts (0.03 mol) of acetamide in 10 parts of a saturated aqueous solution of barium hydroxide is mixed with 2.43 parts (0.03 mol) of 37% formalin. After a short time at room temperature, the solution is saturated with $CO_2$ and filtered. The filtrate is mixed with 4.5 parts (0.03 mol) of trinitromethane. The solution is left for a short time at room temperature and is then heated at 75–80° C. for a sufficient time to complete the formation of an insoluble oil. After cooling in an ice bath to cause the oil to solidify, the liquid is decanted. The solid is recrystallized twice from an ethanol-water mixture to give 3.0 parts (46% of theory) of N-(β,β,β-trinitroethyl)-acetamide in the form of white needles melting at 91–92° C. without decomposition. Impact sensitivity: 2.5 kg. hammer—35 cm.

Calcd. for $C_4H_6N_4O_7$: carbon 21.6%, hydrogen, 2.7%, nitrogen 25.2%. Found: carbon 21.7%, hydrogen 2.7%, nitrogen 26.3%.

*Example 2*

A solution of 3.56 parts (0.4 mol) N-methylol acetamide (made as described by Chivola, Monatsh, 78, 172–3; C.A. 43, 5692) in 20 parts water is treated with 6.0 parts (0.4 mol) trinitromethane and heated at 60° C. as in Example 1. The oily layer which separates solidifies in an ice bath, and 5.2 parts of a yellow solid are filtered. The red filtrate is heated at 70° for a short additional time and then cooled in the ice bath to yield a second crop of 1.2 parts of the yellow solid. After two recrystallizations from an ethanol-water mixture there remained 5.3 parts (60% of theory) of N-(β,β,β-trinitroethyl)-acetamide, white needles melting at 91–92° C. without decomposition.

Calcd. for $C_4H_6N_4O_7$: carbon 21.63%, hydrogen 2.72%, nitrogen 25.22%. Found: carbon 21.86%, hydrogen 2.82%, nitrogen 25.42%.

I claim:
1. As a new chemical, N-(β,β,β-trinitroethyl)-acetamide.
2. The method of making N-(β,β,β-trinitroethyl)acetamide which comprises reacting N-methylol acetamide with trinitromethane.
3. The method of making N-(β,β,β-trinitroethyl)-acetamide which comprises reacting substantially pure N-methylol acetamide with trinitromethane.

No references cited.